March 22, 1949.  H. W. DALTON  2,465,204

TRANSFER MOLDING PRESS

Filed Nov. 6, 1947

INVENTOR
HERBERT WILLIAM DALTON,
By Clarence E. Threedy
ATTORNEY

Patented Mar. 22, 1949

2,465,204

UNITED STATES PATENT OFFICE 2,465,204

TRANSFER MOLDING PRESS

Herbert William Dalton, Redfern, New South Wales, Australia

Application November 6, 1947, Serial No. 784,351
In Australia November 7, 1946

1 Claim. (Cl. 18—30)

This invention relates to moulding presses, and has particular reference to presses for forming mouldings from powders ("plastic" mouldings) by the transfer (injection) process. The press could be possibly adapted to other pressure mouldings, for instance, metal pressure mouldings.

In presses for this purpose it is conventional practice to employ a separate plunger to inject the powder charge (usually in tablet form) into the die after the two halves of the die have been closed. This separate plunger is operated independently from the operation of the ram or rams operating the die, and hence calls for separate manipulation by the operator, and probably loss of time in each moulding, both of which are matters of consequence when many thousands of an articles are being formed in succession.

Furthermore, such conventional system permits of operation of the injection plunger before the die is closed, with the result that the moulding is spoilt.

The object of this invention is to provide a press in which the injection plunger is operated automatically (without manipulation by the operator) immediately after the die has closed. This prevents the spoiling of a moulding, saves time in that the injection is effected as soon as the die has closed, and relieves the operator of the necessity for separately operating the injection plunger.

The injection plunger is operated by the same hydraulic pressure which operates the main die rams.

Figure 1:
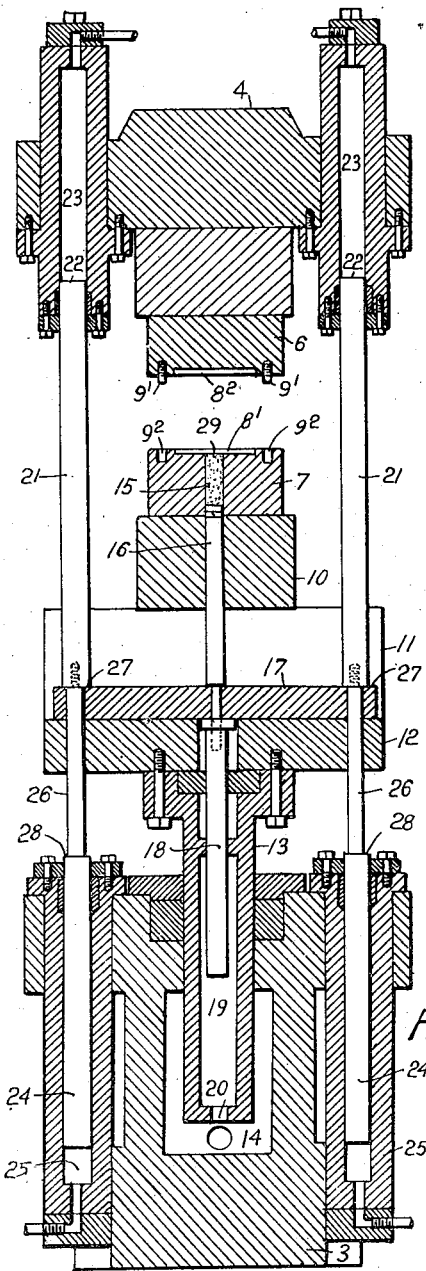
Figure 2:
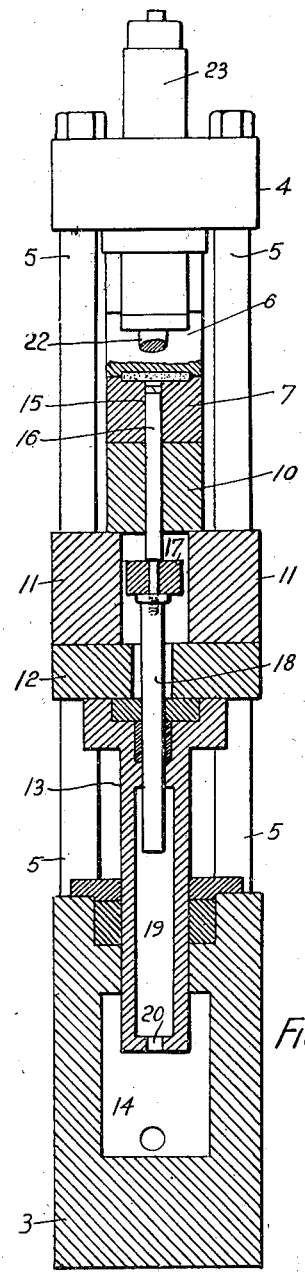

In order to fully describe the invention reference is made to the accompanying drawings, which depict a preferred embodiment of the press, and in which Fig. 1 is a vertical cross-section of the press with the die in open position, and Fig. 2 is an elevation of the press partly in cross-section, taken at right angles to Fig. 1, with the die in closed position after an injection.

The drawings omit conventional ancillary equipment used in such presses such as the external hydraulic control mechanism.

The press comprises the conventional base 3, upper head 4 secured to the base by four standards 5, upper die section 6 secured to upper head 4, and lower die section 7 which is vertically reciprocable under hydraulic power from the open position shown in Fig. 1 to the closed position shown in Fig. 2. The two halves of the moulding recess are conventionally illustrated at 8' in the lower die section, and at 8² in the upper die section. The die sections are provided with the conventional locating pins 9' which engage in recesses 9².

Lower die section 7 is secured on a base 10 which is seated upon two spaced blocks 11, 11 in turn seated upon a die platen 12 secured to the upper end of a main closing ram 13 vertically reciprocable through base 3 and entering a pressure cylinder 14 therein. Thus hydraulic pressure admitted to cylinder 14 will be transmitted by ram 13, platen 12, blocks 11, and die base 10, to the lower die section 7.

Lower die section 7 and base 10 are provided with a cylindrical base 15 to receive a vertically reciprocable injection plunger 16 which is mounted on an injection bar 17 disposed across the press between blocks 11. The injection bar is secured to the upper end of an injection ram 18 entering a pressure cylinder 19 formed within main ram 13 and open to the pressure of main cylinder 14 through an aperture 20 in the main ram. Thus sufficient pressure applied to injection ram 18 will lift injection bar 17 and injection plunger 16 from the retracted position in die section 7 (Fig. 1) wherein the bar 17 rests on platen 12, to the operative position shown in Fig. 2.

Two similar auxiliary double acting ram rods 21, 21 are disposed centrally on either side of the press, and each comprises an upper ram 22 entering a cylinder 23 in head 4, and a lower ram 24 entering a cylinder 25 in base 3. About its mid-length each rod has a reduced section 26 which passes freely through bores in the sides of platen 12 and injection bar 17, terminating in a shoulder 27 above bar 17 and a shoulder 28 below platen 12. The auxiliary ram rods 21 are employed for the initial closing of the die, and for the opening thereof, as explained hereunder.

The operation of the press is as follows:

With the die in the open position shown in Fig. 1, ram rods 26 are in down position with shoulders 27 resting on injection bar 17 which in turn rests on platen 12. Rams 13 and 18 are in the retracted position. The moulding powder charge 29 is dropped into the bore 15 of the die section 7.

Hydraulic pressure is admitted to cylinders 25 of the auxiliary rams, and rods 21 rise and move freely through platen 12 and injection bar 27, until their shoulders 28 engage under platen 12, leaving a free length of their reduced sections 26 above injection bar 17. Continued upward movement of rods 21 lifts the platen 12, and with it the main ram 13, and also the die and injection assembly comprising blocks 11, 11, die base 10, die section 7, and injection bar 17 with attached injection plunger 16. It should be noted that this upward movement of the platen 12, to bring the die section 7 to closed position against die section 6, does not cause any movement of the (retracted) injection plunger 16 in die section 7.

When the die sections have been closed, or substantially so, hydraulic pressure is (automatically) admitted to cylinder 14 of the main ram 13, and hence by aperture 20 to cylinder 19 of the injection ram 18. Owing to the greater surface area of main ram 13 in comparison with injection ram 18, the main ram will be the first affected by this pressure, and it will move to close (if necessary) and seal the die sections, and on the instant that such closure has been fully effected the pressure will cause the injection ram 18 to rise in ram 13 to the position shown in Fig. 2. Elevation of the injection ram lifts injection bar 17 and elevates plunger 16 in die section 7 to inject the charge 29 into the mould cavity and so form the moulding. During this injection movement injection bar 17 slides freely on the reduced sections 26 of ram rods 21, and it is elevated between spaced blocks 11, 11 supporting the die.

The die is opened, after the moulding operation, by release of pressure from cylinders 14, 19 and 25, and the application of pressure to the upper auxiliary cylinders 23. The resultant downward movement of ram rods 21 causes their shoulders 27 to engage the injection bar 17 and force it downwardly to contact platen 12, thereby retracting injection plunger 16 in die section 7, after which the bar 17 forces the platen 12 downwardly, returning the whole press to the open position shown in Fig. 1, ready for the next moulding.

The drawings and the foregoing description are of a preferred embodiment for simple transfer plastic mouldings, and the invention is not limited to such embodiment, but is defined by the appended claim.

I claim:

A moulding press for transfer moulding comprising a fixed die section, a reciprocable die section capable of movement to and from closed relationship with the fixed die section, a platen carrying the reciprocable die section, a main hydraulic ram adapted to close the die sections and hold them in closed relation during injection of the charge, an hydraulic injection ram of smaller area than and disposed within the main ram and subject to the same hydraulic pressure as the main ram, an injection plunger carried by the injection ram, a bar attached to the injection ram and plunger assembly and overlying the die platen, an hydraulic double-acting auxiliary ram passing freely through the die platen and the injection bar, an abutment on the auxiliary ram below the die platen and adapted to move the die sections into closed relation, an abutment on the auxiliary ram above the injection bar and adapted to retract the injection plunger and move the die sections into open relation, and a clearance space between said abutments to permit relative movement of the injection bar away from the platen during operative movement of the injection plunger.

HERBERT WILLIAM DALTON.

REFERENCES CITED

The following references are of record in the file of this patent:

UNITED STATES PATENTS

| Number | Name | Date |
| --- | --- | --- |
| 2,410,909 | Tucker | Nov. 12, 1946 |

FOREIGN PATENTS

| Number | Country | Date |
| --- | --- | --- |
| 687,432 | Germany | Jan. 29, 1940 |